Jan. 10, 1967   F. K. LANDON, JR., ET AL   3,296,827
RESILIENT COUPLING
Filed Dec. 14, 1964
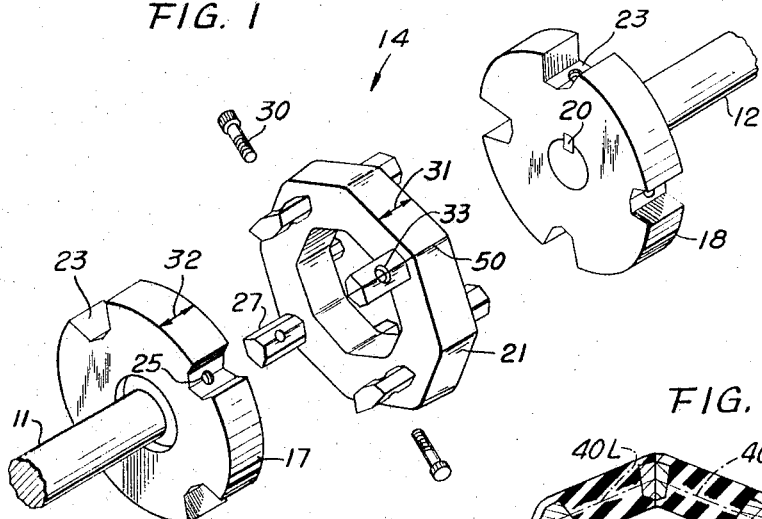
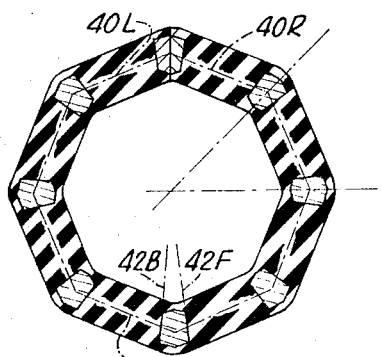
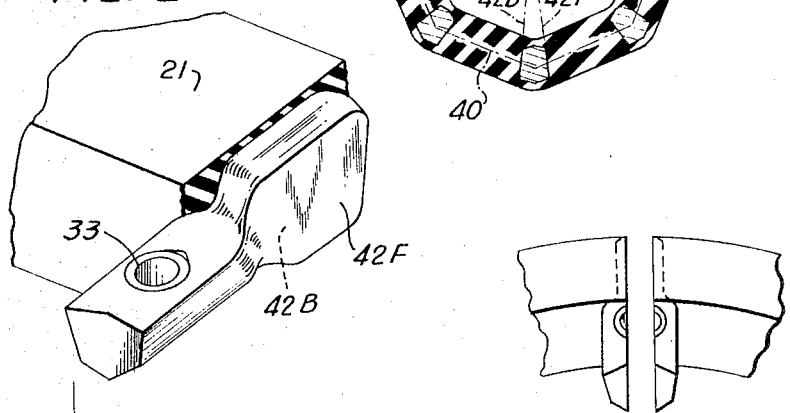
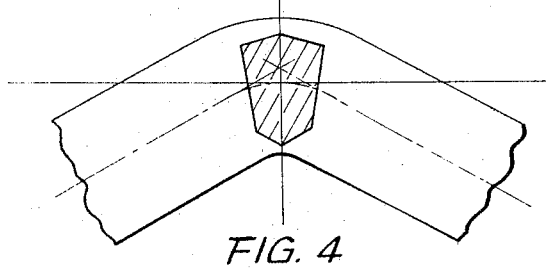
INVENTORS
HERBERT C. DINIAR &
FRED K. LANDON, JR.
BY Oscar B Brumback
their Attorney

United States Patent Office 3,296,827
Patented Jan. 10, 1967

3,296,827
RESILIENT COUPLING
Fred K. Landon, Jr., Reisterstown, and Herbert C. Diniar, Baltimore, Md., assignors to Koppers Company, Inc., a corporation of Delaware
Filed Dec. 14, 1964, Ser. No. 418,220
5 Claims. (Cl. 64—11)

This invention relates generally to flexible couplings for transmitting rotary motion between two generally aligned shafts.

Attempts have been made heretofore to make flexible couplings from a non-metallic, resilient material, such as rubber, because of the advantages imparted to the couplings. For example, they require no lubrication; they are usually economical to manufacture; and they are torsionally resilient. In most instances, the connected equipment is subject to shock loads. The nature of the coupling determines the extent to which the shock is transmitted from one shaft to the other. Resilient couplings are especially attractive for applications where a minimum transmission of the shock loads is desired.

Couplings of such materials, however, have not been particularly successful because of the disadvantages attendant with the use of the resilient material. Natural rubber, for example, has poor mechanical properties in tension; it tends to crack thereby exposing a greater surface area to ozone attack. A synthetic rubber, such as neoprene or Buna N is not so subject to ozone attack. These synthetic rubbers, however, have mechanical properties that are poorer as far as couplings are concerned than natural rubber, especially in those applications where the coupling is subjected to stresses resulting from torsional loads, and from axial and angular misalignment.

This invention provides a novel flexible coupling which utilizes a resilient compressible material but which is preloaded in compression.

The invention contemplates a flexible coupling for connecting a pair of generally coaxial shafts by a resilient and compressible or deformable member that is attached in staggered fashion first to one shaft and then to the other shaft, the attaching means including means for decreasing the radius of said member so that the portion of the member between the adjacent attaching means is preloaded in compression.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike.

FIGURE 1 illustrates, by exploded view, an embodiment of the novel coupling;

FIGURE 2 is an isometric view of a lug of FIG. 1;

FIGURE 3 is a front elevational view of the annulus of FIG. 1;

FIGURE 4 is a detail of a lug joint of FIG. 2, and

FIGURE 5 is a detail of the split lug of FIG. 2.

Referring now to FIGURE 1, a pair of generally axially arranged and substantially abutting shafts 11 and 12 are to be coupled in a torque transmitting relationship by the novel coupling denoted generally at 14. As illustrated herein, hubs 17 and 18 are mounted on shafts 11 and 12 and are to be joined by an annulus 21.

Hubs 17 and 18 may be secured to the shafts 11 and 12 in any suitable manner, as by key 20 in keyways in the shaft and hub. Hubs 17 and 18 have wedge-shaped slots 23 in the perimeter. These slots are, in the embodiment shown, spaced equally around the hub. Centrally located in each slot is a threaded aperture 25.

Adapted to fit in slot 23 are lugs or ribs 27 that extend from annulus 21. These lugs are wedge-shaped to conform to the shape of slots 23. These lugs also include an aperture through which a cap screw 30 can extend for threading into aperture 25 in hubs 17 and 18. If desired, the aperture may be counterbored as at 33 to receive the head of the cap screw.

As illustrated herein, the lugs 27 and the annulus 21 are an integral unit, the lugs are mounted in the annulus. This has the advantage that the resulting part is one piece, is easily and cheaply made, and more importantly, it is readily handled and installed.

Lugs 27 extend, alternately, first from one side of the annulus 21 and then from the other side. In the embodiment illustrated herein, four lugs extend in one direction from one side of annulus 21 and four lugs extend from the other side. The lugs on each side are spaced ninety degrees apart so that the distance between adjacent lugs is 45 degrees. These lugs serve to attach the annulus 21 in staggered fashion to shafts 11 and 12. The distance or radius of these lugs 27 from the axis of the annulus is ten to twenty percent greater than the distance or radius of apertures 23 from the axis of shafts 11 and 12. As lugs 27 fit in the slots 23 of hubs 17 and 18, they decrease the diameter of the annulus 21 and thus compress the material of the annulus.

The lugs are of a length sufficient to span the distance 31 across the axial length of the annulus and the width 32 of the slot in the coupling hub. The lugs are preferably made of steel for reasons of strength. Steel lugs can also be conveniently bonded to the material from which the annulus is made.

Annulus 21 is comprised of a series of rectilinear resilient and compressible columns arranged with their longitudinal axis 40 on the sides of a regular polygon. The lugs are positioned at the point of intersection of the axes of two adjacent columns, such as 40R and 40L, and extend transversely of the longitudinal axes of the columns. As a practical matter the midpoint of the lug, however, is not at the axis of the two lines of intersection of the axes of two adjacent columns because the adjacent corners are rounded to alleviate stresses. Accordingly, referring to FIG. 4, the center of the lug is positioned along the fillet radius joining the axes of two adjacent columns.

The lugs 27 are bonded within the longitudinal columns and are substantially the same width as the cross-sectional area of the column. It is preferred that the lug be completely encapsulated in the resilient material of the column to insure a sound bond of the lug in the annulus. The sides 42F and 42B of the lugs taper inwardly as illustrated by the dotted lines F and B. As the annulus 21 is torsionally deflected in operation, the sides 42F and 42B of the adjacent lugs will form with the ends of the annulus therebetween a substantially rectangular section of the column.

Annulus 21 is made of a resilient material, preferably from material such as rubber which is deformable under a compressive force. A plastic, such as polyurethane, may also be used, if desired. The nature of the resilient, compressible material, of course, will vary with the requirements in operation. Advantageously, the rubber from which the annulus is made has a Shore A durometer hardness of 55–65. If the material be too soft, it will, of course, deform too much and if it be too hard, it will impose bearing loads on the shafts that are intolerable.

A further feature of this invention, particularly as shown in FIGURE 5, is that one of the lugs 27 is split along a radially extending plane, passing through the center of the lug. This permits the annulus to be spread apart so that it may be installed around shafts that are coupled very closely. Even when the shafts are not closely coupled, because of the nature of the coupling used, it had been necessary, heretofore, to back off the shaft in order to mount an annulus to the coupling hubs. The novel split coupling of this invention overcomes the foregoing problem as the annulus can be opened to be placed upon or removed from a shaft or coupling unit. This feature of the split annulus enables the application of the coupling under conditions where it had been necessary heretofore to back one shaft away from the other in order to install the coupling.

In operation, hubs 17 and 18 are placed upon shafts 11 and 12 and secured thereto in a conventional manner as, for example, by the key and keyways. Shafts 11 and 12 are then placed in axial abutting relationship with the amount of end clearance between the shafts as desired. The annulus is then spread apart at split 50 and placed around the shafts 11 and 12 and into position so that the lugs 27 are mated with the recesses 23 in the hubs. The cap screws 31 are tightened to position the lugs securely in the hubs. The annulus is initially from ten to twenty percent larger in diameter in its free state than in its compressed state when the lugs are secured in the hubs. Thus as the lugs move downwardly to engage the recesses in the hubs, the diameter of the polygon which forms the annulus is decreased. This means that the material between the lugs is compressed and thereby prestressed in compression.

The foregoing has presented a novel coupling which is readily removed for replacement and repair and which is readily inserted in position in the field. The resilient material which forms the annulus of this coupling is under compression; however, the annulus is not placed under compression until the coupling is placed into operation. Thus no compressive set is induced in the coupling as a result of shelf storage. The coupling is non-continuous to permit easy installation at the site. The coupling is flexible and resilient.

The coupling described above is a polygon of octagonal configuration. Obviously other polygons may be used as desired. The column between the lugs may be curved so that the annulus is or approaches a circular configuration, but the performance of a circular configuration, i.e., one in which the columns are curved rather than the straight columns of a polygon, is inferior. The reason is believed to be that the columns of a round annulus are subjected to eccentric loading which induces buckling at relatively low stresses.

We claim:

1. A coupling for two generally coaxially arranged shafts comprising an annulus that is a series of rectilinear resilient and compressible columns arranged with their longitudinal axes along the sides of a flat polygon, an arm extending transversely of said longitudinal axes at each intersection of two adjacent columns, alternate arms extending forwardly and rearwardly with respect to the plane of said flat polygon, and means for attaching said arms to said shafts and for decreasing the radius of said polygon whereby the columns are placed under a precompressive load including a hub for each of said shafts, and means operative radially for simultaneously securing said arms to said hubs and compressing said columns.

2. A coupling for two generally coaxially arranged shafts comprising an annular series of connected rectilinear columns arranged with their longitudinal axes forming the sides of a regular polygonal annulus, lugs extending transversely of said polygonal annulus alternately so that the connected rectilinear columns may be attached in staggered fashion to a respective shaft, one of said lugs being split so that the annulus has two ends which may be separated to place the annulus about a shaft, and attaching means including means for decreasing the diameter of the polygon thereby compressing the columns to preloaded columns in compression.

3. A coupling for two generally coaxially arranged shafts comprising an annular series of connected rectilinear columns arranged with their longitudinal axes forming the sides of a regular polygonal annulus, lugs extending transversely of said polygonal annulus and adapted to alternately connect said rectilinear columns in staggered fashion to a respective shaft, one of the lugs being split so that the annulus has two ends which may be separated whereby said annulus may be placed about said shafts without axially displacing said shafts.

4. The coupling of claim 3 and in addition, a hub secured to each of said shafts and wherein said lugs are integral with said annulus, said lugs being generally wedge-shaped with the smaller end directed toward the axes of said shafts, and said hubs having wedge-shaped slots adapted to fit said arms whereby the securing of said arms in said slots compresses said column.

5. The coupling of claim 4 wherein a cap screw extends radially through each of said arms into said slots to secure said arms to said hubs.

References Cited by the Examiner

UNITED STATES PATENTS

| | | | |
|---|---|---|---|
| 2,024,777 | 12/1935 | Neumann | 64—17 |
| 2,270,140 | 1/1942 | Piron | 64—13 |
| 2,421,134 | 5/1947 | Venditty | 64—14 |
| 2,982,118 | 5/1961 | Franceschetti et al. | 64—13 |
| 3,112,626 | 12/1963 | Barone | 64—11 |
| 3,238,742 | 3/1966 | Martorana | 64—11 |

FRED C. MATTERN, Jr., *Primary Examiner.*

HALL C. COE, *Examiner.*